United States Patent [19]
Kring et al.

[11] 3,852,169
[45] Dec. 3, 1974

[54] MEASUREMENT OF CARBON MONOXIDE IN GAS MIXTURES

[75] Inventors: Elbert Victor Kring, Hockessin; William Ray Wolfe, Jr., Wilmington, both of Del.

[73] Assignee: E. I. du Pont de Nemours and Company, Wilmington, Del.

[22] Filed: Nov. 1, 1972

[21] Appl. No.: 302,859

[52] U.S. Cl.............................. 204/1 T, 204/195 R
[51] Int. Cl...................... G01n 27/00, G01n 27/46
[58] Field of Search.. 204/1 T, 1 R, DIG. 3, DIG. 4, 204/195 R; 136/86, 153; 23/232

[56] References Cited
UNITED STATES PATENTS

| | | | |
|---|---|---|---|
| 3,149,921 | 9/1964 | Warner................................ | 23/232 |
| 3,216,911 | 11/1965 | Kronenberg......................... | 204/1 T |
| 3,575,718 | 4/1971 | Adlhart et al........................ | 136/86 |
| 3,616,274 | 10/1971 | Eddy.................................... | 204/1 T |
| 3,719,529 | 3/1973 | Lake..................................... | 136/86 R |

OTHER PUBLICATIONS
La Conti et al., J. of the Electrochem. Soc., 118, 506–510, (1971).

*Primary Examiner*—G. L. Kaplan

[57] ABSTRACT

A selective electrochemical method for measuring carbon monoxide in admixture with other electrochemically oxidizable gases, for example, hydrogen, hydrocarbons and oxides of nitrogen, and especially exhaust gases from internal combustion engines, which method comprises supplying the gas mixture to an anodic electrode to oxidize the CO to $CO_2$ while simultaneously supplying an $O_2$-containing gas to a cathodic electrode to reduce the $O_2$ to $O^=$, said electrodes being separated by an electrolyte, and determining the CO content by directly correlating the current which is produced and measured in an external circuit with a known CO standard.

11 Claims, 2 Drawing Figures

MEASUREMENT OF CARBON MONOXIDE IN GAS MIXTURES

BACKGROUND OF THE INVENTION

1. Field of the Invention

The present invention relates to an electrochemical method for measuring the amount of carbon monoxide in gaseous mixtures thereof containing at least one additional oxidizable compound.

2. Description of the Prior Art

Methods for the measurement of the carbon monoxide level in gaseous mixtures thereof containing at least one additional oxidizable compound are important not only in the field of analytical chemistry but also in related scientific areas. For example, the quantitative determination of carbon monoxide in the exhaust gases of internal combustion engines is of ecological significance. One such known method of measurement is based upon nondispersive infrared absorption (NDIR). Such a method may require expensive equipment and a trained operator. Alternative known methods for determining carbon monoxide in exhaust gases may be adversely affected by other readily oxidizable gases, such as hydrogen, oxides of nitrogen and gaseous hydrocarbons, which also are present in the exhaust gas. According to the well-known Ballantyne's Rule, the amount of hydrogen in an exhaust gas is approximately one third, by volume, that of the carbon monoxide.

Another method for measuring carbon monoxide in engine exhaust gases, such as disclosed in U.S. Pat. No. 3,549,327, requires selective chemical oxidation of the more readily oxidizable components, such as hydrogen, and removal of water before the measurement of carbon monoxide can be effected. Moreover, the method may require the application of a correction factor if any residual hydrocarbons are present. Still another method, which may be costly and difficult to carry out, is one such as disclosed in U.S. Pat. No. 2,569,895 and involves the determination of carbon monoxide in air or in admixture with other gases by means of a color reaction with palladous sulfite and/or palladosulfite. Another method, such as disclosed in U.S. Pat. No. 3,258,411, consists of a galvanic monitoring process for determining carbon monoxide in air or other gas and involves the chemical reaction of carbon monoxide and $I_2O_5$ to produce iodine vapor which is reduced at the cathode of an electrochemical cell. Although the process may be applicable to determination of carbon monoxide in exhaust gas, in operating the cell the active carbon anode must participate in the chemical reaction. U.S. Pat. No. 3,149,921 discloses a method for measuring an electrochemically active gas, for example, hydrogen, admixed with a nonreactive gas, by means of a fuel cell in which the active gas to be measured is supplied to one electrode, a second active gas is supplied to a second electrode electrically connected to the first electrode, and the amount of current developed in the system is taken as a measure of the concentration of the material being determined. The electrodes may be platinum mesh or a supported platinum black. U.S. Pat. No. 3,393,100 discloses the use of a platinum/molybdenum and/or tungsten oxide electrode in a fuel cell which is used with hydrogen-rich reformer gas and 100 percent carbon monoxide fuels, such electrodes being resistant to poisoning by the carbon monoxide. La Conti et al. in the Journal of the Electrochemical Society: Electrochemical Technology, 118, 506-510 (1971) disclose a method for determining carbon monoxide in inert or oxygen-containing gases by means of an electrochemical sensor employing a platinum on boron carbide electrode and a lead oxide counter reference electrode.

SUMMARY OF THE INVENTION

It is an object of the present invention to provide a method of measuring the concentration of carbon monoxide in gaseous mixtures containing at least one other readily oxidizable gas. Another object is to provide a rapid and easily operable method of detecting and monitoring the carbon monoxide content of automobile exhaust gas. A further object is to provide a simple method of analyzing internal combustion engine exhaust gases, which method employs an electrochemical cell having selective response to carbon monoxide.

In summary, the present invention resides in a method of measuring the concentration of carbon monoxide in gaseous compositions containing up to 15 volume % of a mixture of carbon monoxide and another readily oxidizable gas which is capable of being used as a reductant in a fuel cell, the volume ratio of the other readily oxidizable gas to carbon monoxide being at least 0.1:1, which method comprises a. supplying said gaseous composition, at a constant predetermined flow rate and temperature, to a first, gas permeable, hydrophobic, electronically conductive electrode (anode) contained in an electrochemical cell and separated therein from a second electrode (cathode) by a suitable electrolyte, for example, aqueous acid, the first electrode being capable of effecting electrochemical oxidation of carbon monoxide to carbon dioxide in the presence of the electrolyte;

b. at the same time supplying an oxygen-containing gas to the second electrode which is a gas permeable, hydrophobic, electronically conductive electrode which is capable of effecting electrochemical reduction of oxygen to $O^=$, that is, chemically bound oxygen, for example, water, in the presence of the electrolyte;

c. measuring the current or voltage generated in the cathodic and anodic reactions in an external circuit between the two electrodes, and d. directly correlating, by comparison with a standard, the flow of electric current or development of voltage in the external circuit with the concentration of carbon monoxide in the gaseous composition.

In a preferred embodiment, the gaseous composition being analyzed contains up to 5 volume % of a mixture of carbon monoxide and another readily oxidizable gas and the volume ratio of the other readily oxidizable gas to carbon monoxide is 0.4:1 to 3.0:1. Especially useful gaseous compositions are internal combustion engine exhaust gases containing 0.01–8 volume % of carbon monoxide.

DETAILED DESCRIPTION OF THE INVENTION

Figure 1:
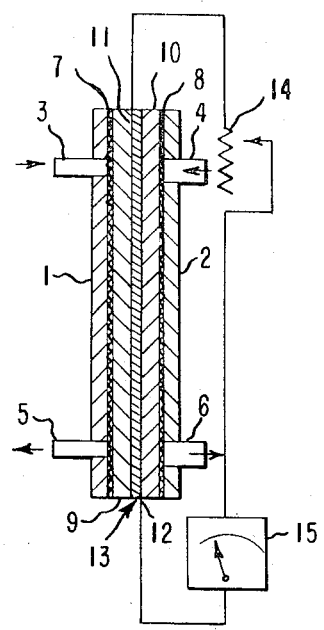
FIG. 1 illustrates an electrochemical cell assembly consisting of the electrode and matrix elements and associated hardware and external circuitry for handling the carbon monoxide-containing gas mixture for the anode and the oxygen-containing gas for the cathode.

This invention is based upon the discovery that an electrochemical cell as hereafter described can be employed to quantitatively and selectively measure carbon monoxide in the presence of another gas which is electrochemically oxidizable. Such a cell is extremely useful in the measurement of carbon monoxide in the exhaust gases of internal combustion engines. Surprisingly, the measurement is specific to carbon monoxide, and other electrochemically oxidizable gases such as hydrocarbons, hydrogen and oxides of nitrogen do not interfere.

The process of this invention as defined above is carried out in an electrochemical cell comprising:

1. a first electrode (anode) that is gas permeable, hydrophobic, electronically conductive and capable of effecting electrochemical oxidation of carbon monoxide to carbon dioxide,
2. a second electrode (cathode) that is gas permeable, hydrophobic, electronically conductive and capable of electrochemically reducing oxygen to $O^=$ during cell operation,
3. a separating electrolyte, and
4. means to supply the carbon monoxide-containing gas to the first electrode and the oxygen-containing gas to the second electrode.

First Electrode (Anode)

The anode consists of a catalytically active metal component which is capable of oxidizing carbon monoxide to carbon dioxide, usually in combination with an organic or inorganic binder or support, and other conductive materials that provide contact with a current collecting means so that the current generated can flow to an external circuit. The structure is rendered permeable to the carbon monoxide-containing gas by a suitable process of construction and it is rendered impermeable to the electrolyte by use of materials of construction that exhibit hydrophobic properties.

Such electrodes are well known in the art. In a typical electrode suitable for use in this invention, a finely divided, catalytically active metal powder is mixed with an aqueous emulsion of a polymer resin and converted into a thin sheet, the water is evaporated and the resultant material is sintered, if desired, inito a coherent, gas permeable but liquid impermeable mass. By employing a sufficient amount of the metal powder, electrical conductivity can be achieved. For example, loadings may vary from about 100–200 milligrams/cm.$^2$ if the cost of the metal powder used as the oxidation catalyst is not high, to about 5–10 milligrams/cm.$^2$ if relatively expensive noble metals such as platinum are used. The use of an aqueous emulsion of a polytetrafluoroethylene resin, preferred, imparts hydrophobic characteristics as well as chemical inertness and temperature stability to the gas permeable sintered electrode. Such use assures the presence of, for the purpose of electrochemical oxidation of carbon monoxide, the required interface between three essential components, namely, the imput gas containing carbon monoxide, the active metal component of the anode and the electrolyte (from the adjacent matrix) which provides an internal diffusion path through the cell for ions produced as the carbon monoxide is oxidized.

Another electrode which is known in the art and which is suitable for use in this invention employs a relatively inexpensive catalyst for a fuel cell electrode and is particularly useful with acid electrolytes. The catalyst is an acid insoluble solid material composed of at least one oxide of molybdenum and at least one sulfurated compound of molybdenum, the ratio of oxygen-to-sulfur being 36:1 to 1:36. Such an electrode has been found to be relatively insensitive to oxidizable hydrocarbons which are present along with the carbon monoxide.

Still another anode which is known in the art and which is preferred in this invention, particularly because of its resistance to carbon monoxide poisoning, consists of platinum and a molybdenum and/or tungsten oxide. Platinum electrodes which include proprietary platinum catalysts are commercially available.

Other known preferred electrodes include those which are formed from a mixture of catalytic and gas adsorbing materials and consist of a chromium-tungsten oxide and a metal dispersed on a support (the metal being selected from the class consisting of noble metals and alloys of noble metals), a current collector and a binder.

Second Electrode (Cathode)

The cathode must be capable of reducing oxygen to $O^=$ during cell operation so that water, metal oxide or metal hydroxide is formed. Since the degree of gas permeability and the electrical conductivity requirements are similar to those of the first electrode, the second electrode element is similarly prepared except that a catalyst capable of reducing oxygen is used. The cathode can be a sintered polytetrafluoroethylene/platinum electrode containing sufficient conductive solid, such as graphite or carbon black, to make the cathode electrically conductive. Ordinary platinum black is preferred since it is chemically and thermally stable and is highly efficient in adsorbing oxygen from an oxygen-containing gas, such as air, whether the gas contacts the platinum black by forced or natural convection. The catalyst loading in the cathode should be sufficient to adsorb and reduce enough oxygen to electrochemically balance the carbon monoxide to carbon dioxide oxidation simultaneously taking place at the anode. Standard electrochemical equations can be written by those skilled in the art to represent the oxidation-reduction reactions occurring at the anode and cathode. The electrochemical balance of the equations means that as long as the second electrode is capable of reacting stoichiometrically, there will be no net buildup of electrical charge at either electrode. Since air is used as the oxygen-containing gas which is supplied to the second electrode, this electrode is air-oxygen biased and requires no external source of electrical bias to sustain the electrochemical reaction taking place. The rest potential of the air-biased electrode also favors the oxidation reaction of carbon monoxide over oxidation of the oxides of nitrogen at the anode. The loading of the second electrode element with oxygen-adsorbing catalyst generally tends to be about equal to the loading of the first electrode with carbon monoxide-adsorbing catalyst, that is, 5–10 milligrams/cm.$^2$ of noble metal content. Catalytic electrodes of suitable size and shape can be devised by those skilled in the art. Typical electrode elements can be of any suitable dimensions, for example, 3 × 3 inches of active area.

The Separating Electrolyte Between Electrodes

A suitable ionically conductive electrolyte must be placed between the two electrodes to enable hydrogen ions formed at the anode to move the cathode whereat they react with electrons and the oxygen-containing gas. A medium that will transport a hydrogen ion, either alone or associated with a water molecule as a hydronium ion, is employed as the electrolyte. The electrolyte preferably is contained in a matrix which can restrict the free flow or circulation of electrolyte solution sufficiently to provide insensitivity to inertial effects, particularly those sometimes met when making measurements of carbon monoxide in exhaust streams from internal combustion engines mounted in moving vehicles. The electrolyte medium generally is hydroxylic and can contain an alkaline, neutral or acidic solute such as is known in the art. Aqueous acid electrolytes are preferred. Suitable acids include phosphoric acid and sulfuric acid, phosphoric acid being especially preferred if the electrochemical cell is to be operated for prolonged periods at elevated temperatures, for example, up to about 320°F.

A matrix generally should be such as to be able to sorb or retain liquid electrolyte by means of capillary forces in the interconnecting pores of a fibrous inorganic or polymeric organic core. Alternatively, electrolytically conductive solid ion exchange resins containing, for example, sulfonyl groups, can be employed. Furthermore, liquid and solid electrolytes can sometimes be combined in composite matrices to provide desirable properties, such as high ionic conductivity and gas impermeability. Matrices that are porous enough to sorb sufficient liquid electrolyte must nevertheless be impermeable to the reactive gases at the two electrodes as well as to the nonreactive gases that may also be present in the carbon monoxide- and oxygen-containing gases. A mechanically strong matrix which has these properties and which is useful in the present invention can be prepared by a process in which a mixture of 95% by weight of powdered or fibrous inorganic zirconium pyrophosphate ($ZrP_2O_7$) and 5% of a polytetrafluoroethylene is formed into a film that has a nominal thickness of 0.025 inch. The film generally is kept in the water-wet state since complete rehydration of the dried matrix is difficult. The pressure required to force gas through the water-wet matrix at room temperature exceeds 20 psi. bubble pressure. Typical porosities of such wet films can reach 67%, about half the pores being 1–10 microns in diameter. Cell resistivity is typically, 0.4 ohm-cm.$^2$ when the matrix contains 85% phosphoric acid as the acid electrolyte at a temperature of 150°F.

For use in the process of this invention, wherein advantage lies in measuring the carbon monoxide content of gas streams at elevated temperatures, sulfuric acid is a suitable electrolyte at temperatures of about 80°F. Phosphoric acid can be used up to 320°F., usually at about 150–210°F., and is preferred because its use permits operation of the anode at the higher temperatures at which there is greater resistance to carbon monoxide poisoning of the catalyst. The aqueous acid generally is employed at a strength which produces an internal call resistance of a fraction of an ohm, for example, 85% phosphoric acid or 3N sulfuric acid.

To withstand the elevated temperatures, it is usually desirable to fabricate the matrix from a temperature-resistant, chemically inert material. Inert fluorocarbon polymers generally are employed, but fluorocarbon substrates or cores which are fabricated so as to have surface activity also are useful. For example, a porous polytetrafluoroethylene sheet which is coated with a fluorocarbon sulfonic acid copolymer provides a structure which, when wet with aqueous acid electrolyte of sufficient strength, exhibits high ionic conductivity and is satisfactory as a matrix herein. If the fluorocarbon core is a copolymer of a fluorinated vinyl monomer and a fluorinated sulfonyl-containing vinyl monomer, the coating copolymer contains a greater number of sulfonyl groups than the core. These structures exhibit increased surface activity and high bubble pressure resistance. Such copolymer coated materials are readily available commercially.

Gaseous Mixtures for Analysis

The imperfect combustion of hydrocarbon fuels in combination with an oxidizer, such as air, produces a mixture of products, some of which are gases capable of further oxidation. Internal combustion engine exhaust gas generally comprises carbon dioxide and water (as the main products of combustion, nitrogen (residual when air is used as oxidant), some oxygen, carbon monoxide, hydrocarbons, oxides of nitrogen, sufur dioxide (when sulfur is present in the original fuel) and small quantities of hydrogen (proportionate to the amount of carbon monoxide present). Exhaust gases which are analyzed in the process of the invention contain appreciable amounts of carbon monoxide, for example, 0.01–8 volume %, and hydrocarbons, for example, in a hydrocarbon to carbon monoxide volume ratio of 0.001:1 to 2.0:1. Typical concentration (by volume) ranges of other components in exhaust gases are 70–80% $N_2$, 0–10% oxygen, 0–15% $CO_2$ 0–7% $H_2O$, 0–5% $H_2$, 0–5% $SO_2$ and 0.01–0.5% oxides of nitrogen.

Characteristic products of the imperfect combustion of hydrocarbon fuels can be classified as fuel-derived, combustion-derived and oxidizer-derived gases. The products are those typical of gaseous, liquid or solid fuel systems. Gaseous fuel systems include those burning blue water gas, carbureted water gas, coke oven gas, coal gas, oil gas and producer gas. Liquid fuel systems include those burning alcohol and benzol fuels, coal tar, tar oil, kerosene and gasoline. Solid fuel systems include those burning coal, coke, char, petroleum cokes, wood, charcoal, tanbark and bagasse. Of particular interest are the products of combustion of hydrocarbon fuels for internal combustion engines. Such fuels include gasoline, kerosene and diesel fuel, especially gasoline blends for automobiles containing paraffinic, olefinic and aromatic hydrocarbon components (determinable by ASTM Method D1319). Such components comprise volatile saturated and unsaturated hydrocarbons including alkanes, alkenes, alkadienes and aromatic hydrocarbons. Fuel-derived combustion products include n-butane, isopentane, methylcyclopentane, 2,2,4-trimethylpentane, n-heptane, 2-methyl-2-butene and trans-3-hexene, all of which are electrochemicaly oxidizable gases at temperatures below about 320°F. Combustion-derived combustion products include electrochemically oxidizable hydrocarbon gases of low molecular weight, such as methane, ethane, ethylene, propylene, propadiene, isobutylene, 1-butene, 1,3-butadiene, trans-2-butene, cis-2-butene, acetylene and methylacetylene. These are produced by thermal breakdown of the fuel and usually are not present in the original fuel. Certain hydrocarbon products may, of course, fall into both the aforementioned categories. Combustion-derived combustion products also include nonhydrocarbons such as carbon dioxide, carbon monoxide, water, hydrogen, oxides of nitrogen and sulfur dioxide. Of these, carbon monoxide, hydrogen and the lower oxides of nitrogen are readily electrochemically oxidizable. The fuel cell art suggests that, of these, hydrogen is the most readily oxidized and is a more efficient fuel for a fuel cell than, for example, carbon monoxide. Oxidizer-derived combustion products generally include components originating in and derived from the oxidizer. For example, from air is obtained nitrogen, oxygen, carbon dioxide and water.

Particularly preferred gaseous mixtures for analysis by the method of this invention are exhaust gas mixtures which have been passed through emission control devices, for example, of the catalytic or afterburner type. Gaseous mixtures which have been diluted with air or a nonreactive carrier gas or which have been sampled at a distance from the engine exhaust pipe are also suitable for analysis by the method of this invention provided the diluted concentration of carbon monoxide remains above the minimum level detectable by the method of this invention, that is, about 100 ppm.

External Circuit and Overall Assembly

The apparatus of FIG. 1 consists of Teflon FEP fluorocarbon-coated stainless steel end plates 1 and 2 containing inlet ports 3 and 4 and exit ports 5 and 6, tantalum gas dispersion screens 7 and 8, gas permeable, electronically conductive electrodes 9 and 10, electrode 9 (anode) containing nonpoisoning catalyst for oxidizing CO to $CO_2$, electrode 10 (cathode) containing $O_2$-adsorbing catalyst capable of reducing $O_2$ to $O^=$, anode current collecting screen 11 and cathode current collecting screen 12, both gold or gold plated, matrix 13 containing aqueous acid electrolyte between screens 11 and 12 and contacting electrodes 9 and 10 and variable load resistor 14 and electric current indicator ammeter 15, both connected in series electrically with current collecting screens 11 and 12. In adddition to the end plates 1 and 2, the exposed edges of anode 9, cathode 10 and matrix 13 are coated with Teflon FEP fluorocarbon so as to provide a sealed housing except for ports 3, 4, 5 and 6. End plate 1, gas ports 3 and 5 and screen 7 define a flow path for the carbon monoxide-containing gas through the anode section. End plate 2, gas ports 4 and 6 and screen 8 define a flow path for the oxygen-containing gas through the cathode section. Screen 11, variable resistor 14, ammeter 15 and screen 12 define an external flow path for electrons from anode 9 to cathode 10. Matrix 13 defines an internal flow path for $H^+$ or $H_3O^+$ ions from anode 9 to cathode 10.

In cell operation according to the method of this invention, a gaseous mixture containing CO and fuel-derived and/or combustion-derived hydrocarbons, as defined above, is introduced through inlet port 3 and dispersed through screen 7, thereby contacting and permeating anode 9. The CO is preferentially adsorbed on nonpoisoning catalyst within anode 9 and is oxidized to $CO_2$ gas which passes from the cell through exit port 5 with the fuel-derived and combustion-derived hydrocarbons and other constituents that are present as characteristic products of the incomplete combustion of hydrocarbon fuels. The $H^+$ or $H_3O^+$ which formed in the oxidation reaction diffuses through matrix 13 toward cathode 10. Electrons released by the oxidation reaction are transported, through the external path provided, toward cathode 10. Simultaneously, oxygen-containing gas is introduced through port 4 and is dispersed through screen 8, thereby contacting and permeating cathode 10, and the oxygen-adsorbing catalyst contained therein catalyzes the reaction of oxygen and electrons from the external circuit with the $H^+$ or $H_3O^+$ arriving via the matrix to produce $H_2O$. The current flow through the external circuit, as measured on ammeter 15, is adjusted by means of variable resistor 14 (usually having a resistance of 0.1-10 ohms) so as to get the most linear possible response of current to CO concentration.

Typical Gas Handling Procedures

Figure 2:
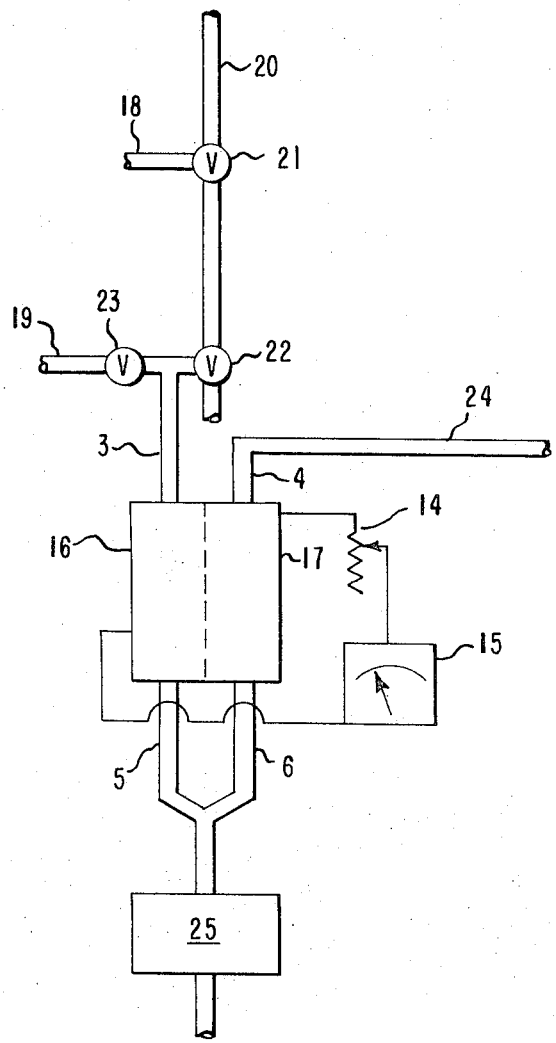
FIG. 2 illustrates means for introducing into the electrochemical cell of FIG. 1 the carbon monoxide- and oxygen-containing gases.

FIG. 2 illustrates means for introducing into the electrochemical cell of FIG. 1 a gaseous mixture containing CO and fuel-derived and/or combustion-derived hydrocarbons, and more specifically, a gaseous mixture containing 0.01-8 volume % CO and wherein the volume ratio of other electrochemically oxidizable gases to CO is at least 0.1:1, preferably 0.4:1 to 3.0:1.

A first gas feed means illustrated in FIG. 2 involves introducing the gas stream to be analyzed for CO directly into the anode section. It is best usable from about 0.01-1%, by volume, CO. A second gas feed means illustrated in FIG. 2 involves sampling the gas stream and then sweeping the entrapped gas sample with air or other inert sweep gas into the electrochemical cell. It is best used when CO concentrations range from about 1-8% by volume. When CO concentrations range from about 0.02-1% by volume, either means may be used.

FIG. 2 consists of an electrochemical cell which is similar to that of FIG. 1. The anode and cathode sections are shown schematically as 16 and 17, respectively. Attached externally to port 3 of anode section 16 are pipes 18 and 19 for admitting air and pipe 20 for admiting the CO-containing gas. Valves 21, 22 and 23 are employed to introduce the CO-containing gas, air or both into the anode section 16. Pipe 24 and port 4 are attached externally to the cathode section 17 for admitting the $O_2$-containing gas. On the exit side of both sections 16 and 17 are exit ports 5 and 6 joined together near the entrance of gas pump 25 which is useful in establishing constant flow rates of gas mixtures and air. Indicating current meter 15 and variable load resistor 14 are connected externally as described for FIG. 1.

The first gas feed means and its use in detecting CO at a concentration of 0.01 to 1% in the CO-containing gas mixture consists of passing such a gas mixture directly through the anode section 16 by proper alignment of valves 21 and 22. Valve 23 controlling a sidestream of air through pipe 19 to zero adjust the current flow meter 15 remains closed during this time. The gas mixture enters pipe 20, flows through valves 21 and 22, through port 3 and enters anode section 16 wherein the CO is oxidized to $CO_2$; the mixture now containing $CO_2$ leaves anode section 16 by port 5 and is exhausted by pump 25 which preferably maintains flow rates of about 50-20 cc./minute. Such flow rates produce nearly linear response of electrical current to CO concentration over the practical range of measurement. A flow of about 100 cc./minute generally is acceptable for a 3 × 3 inch anode containing a preferred platinum catalyst, for example, a proprietary catalyst sold commercially. Flow rates of $O_2$-containing gas through pipe 24 to the cathode side 17 are usually maintained about equal to the flow rates through the anode side during measurement of CO concentration. The $O_2$-containing gas, for example, air, should be drawn by pump 25 through the port 4, the cathode section 17 and the exit port 6 at a rate such that the cathode reduction reaction can be carried out stoichiometrically with the anode oxidation reaction. Low flow rates on the cathode side, for example, even natural convection of air past the cathode, may sometimes be adequate for stoichiometric reaction when a highly efficient platinum black catalyst is used and the CO concentration is low.

The second gas feed means and its use in detecting CO at a concentration of 1–8% in the CO-containing gas mixture consists of sampling a gas mixture so that a portion of a gas stream, generally about 15 cc., is entrapped between valves 21 and 22. Standby air then is passed through the anode compartment via pipe 19 and valve 23 to zero set meter 15. To measure the CO content of the entrapped gas, valve 23 then is closed and valves 21 and 22 are adjusted so as to open pipe 18 to admit air or other inert sweep gas into the anode compartment. The entrapped gas sample is thus pumped into the cell, thereby producing a linear and reproducible response of current (on meter 15) to CO concentration; the needle of the meter rises to a maximum reading in a response time of about 15–60 seconds and then drops back to a zero reading as the anode begins to receive air or inert sweep gas.

At intervals, air flow must be conducted through both the anode 16 and the cathode 17 in order to zero the meter 15. Valve 22 is closed to the anode while valve 23 is opened. Gas pump 25 maintains balanced air flow rates through the anode and cathode sections. Unbalanced flow rates may lead to generation of small voltage differences which can result in eroneous zero settings on the current meter.

A gas sampling valve of the type used in gas chromatography for taking samples of about 10–20 cc., when substituted for the above sampling arrangement, reduces the amount of valve manipulation required and can be used at concentrations as low as 0.04% CO.

Operating Termperatures

For some combinations of electrodes and matrix a cell may be operable at ambient temperature. For measuring CO concentrations of less than about 1% the cell generally is heated to a fixed operating temperature to improve response. In any event, the temperature should be constant during determination of CO so that the cell response (current produced) can be compared with cell response data from standard gas samples, that is, containing known amouns of CO. A temperature in the range 80–320°F. is satisfactory when phosphoric acid is used as the electrolyte. The preferred temperature, 160°–210°F., is sufficient to provide ample response without causing upset of the natural water balance of the cell by evaporation. Such a temperature is conveniently established by pressing disc-type heating elements against the external surfaces of the two end plates of the electrochemical cell shown in FIG. 1. Alternatively, if the gas mixture still carries heat of combustion, heat extraction may be required to achieve the operating temperature for the cell.

Direct Correlation of Electric Current Flow with Concentration of Carbon Monoxide Gas Direct correlation consists of establishing and using a proportionality, usually in graphical or tabular form, between indicated current and CO concentration in simulated or actual exhaust gases in which CO concentration is known and varies over the range of interest. When using exhaust gas itself, the CO concentration is determined independently, for example, by the NDIR method, and the CO contents are correlated with the currents produced from the same sample in the fuel cell. A convenient way to vary the CO content of such natural mixtures is to vary the rate of fuel combustion. Generally, changing the combustion rate also varies the hydrogen and hydrocarbon contents. The volume ratio of total hydrogen and hydrocarbons to CO can be verified by known methods of analysis. Whatever the method used for preparing reference plots and table showing cell response versus CO concentration, the cell responses are determined at constant flow rates and temperatures in identical cells of the same construction.

During direct correlation of electric current flow in the external circuit between anode and cathode, the current indicated by the current meter or the volage drop across a fixed value standard resistor inserted for the purpose of current measurement varies from a fraction of a milliampere to about 100 milliamperes, increasing with CO concentration, electrode area, and particularly, by operating the electrochemical cell at an elevated temperature (which improves the sensitivity of measurement). A constant flow rate predetermined by the pumping rate is essential.

Proportional current response to CO in a simulated or actual exhaust gas which includes one or more hydrocarbons is observed to be essentially invariant for volume (mole) ratios of hydrocarbon to CO of 0.001:1 to 2.0:1 using a preferred oxidation catalyst, phosphoric acid electrolyte and a preferred operating temperature. Direct correlation with exhaust gas readies the electrochemical cell for use with exhaust gases of unknown CO contents.

Utility

In addition to monitoring the concentration of carbon monoxide in the exhaust gas of internal combustion engines of motor vehicles, the present invention can be used to trigger an alarm system, for example, a light or a horn, when the CO content of the atmosphere exceeds predetermined threshold values.

EXAMPLE

An electrochemical cell was utilized which contained a. an electrode (anode) which contained a platinum-containing catalyst capable of oxidizing CO to $CO_2$, b. a porous matrix of the polytetrafluoroethylene/$ZrP_2O_7$ type previously described and made ionically conductive with 85% aqueous phosphoric acid electrolyte, and (c) a platinum black electrode as air-oxygen cathode, capable of reducing stoichiometric amounts of $O_2$ to $O^=$. The electrodes and separating matrix together comprised a cell with working electrode dimensions of about 3 by 3 inches essentially as described in FIG. 1 and equipped with the first gas feed means as described in FIG. 2. Its response to automotive exhaust gas was compared directly with an NDIR instrument reading CO content during an actual emission analysis run using an automotive vehicle on a dynamometer stand. The car was operated at various speeds to vary the CO content in the exhaust with the expectation that the hydrogen content would vary in proportion to the CO content according to Ballantyne's Rule. The exhaust stream after passing through the NDIR instrument was passed directly through the anode section of the above-mentioned cell while air was passing over the cathode. In other words, the platinum black cathode of the cell was operated as an air-biased air-oxygen electrode as oxidizables in the exhaust were introduced into the anode of the cell. The cell was operated at two temperatures, 80°F. and 160°F. Correlations of current read with a Weston 911 milliammeter which also served as load resistor were produced with the concentrations of carbon monoxide observed by NDIR as shown in Table 1. The activity of oxidizables in the exhaust was much higher at 160°F. The meter resistance was 0.9 ohm in the 100 milliampere range and 4.3 ohms in the 10 milliampere range.

The test car was later run under the same conditions to obtain hydrocarbon levels by flame ionization analysis. The data obtained on hydrocarbons are also shown in the following table.

In a separate test, a 1.96% in nitrogen stream was passed through the cell (without air sweep) and the cell current was 63 milliamperes (in comparison to the 70 milliampere response observed at the same CO level in the exhaust gas under the same conditions of temperature and flow rate). This indicates that the other exhaust gas components contribute little if any to the current generated by the CO of the gas mixture.

The highest CO level in the exhaust was obtained with the car at maximum speed on the dynomometer (50 m.p.h.). At this speed the exhaust also contained 15,000 ppm. of total hydrocarbons. Since the electrochemical cell was producing current equivalent to that generated by the same amount of CO in a nitrogen stream, this indicates that the cell was not responsive to total hydrocarbons at 160°F. (in agreement with results obtained in separate experiments which involved passing n-hexane vapors along with CO and nitrogen through the cell).

TABLE

INDICATED CURRENT FLOW AND DIRECT CORRELATION WITH CO CONTENT

| Cell Temperature (°F.) | Current (milliamperes) | % CO by NDIR | Engine Speed (m.p.h.) | Hydrocarbon (ppm.) |
|---|---|---|---|---|
| 80 | 0 | 0 | — | 0 |
| 80 | 0.5 | 0.32 | Idle | 4,000 |
| 80 | 1.1 | 1.68 | 20 | 2,500 |
| 80 | 1.3 | 1.86 | 30 | 8,500 |
| 160 | 0.5* | 0 | — | 0 |
| 160 | 6.1 | 0.18 | 20 | 2,500 |
| 160 | 70 | 1.96 | 50 | 15,000 |

*A background reading observable even with ostensibly balanced air flows through anode and cathode.

The embodiments of the invention in which an exclusive property or privilege is claimed are defined as follows:

1. Method of measuring the concentration of carbon monoxide in internal combustion engine exhaust gas, said exhaust gas comprising carbon monoxide and other reductant gases, the volume ratio of the other reductant gases to CO being in the range 0.1:1 to 3.0:1, the method comprising the steps:
   a. supplying simulated or actual internal combustion exhaust gas containing a known concentration of carbon monoxide, said simulated gas containing a concentration of carbon monoxide equivalent to that in the actual gas, at a constant flow rate and temperature, to a gas permeable, hydrophobic, electronically conductive, anodic electrode of an electrochemical cell which is operated at a temperature within the range 80—320°F., which electrode is capable of effecting electrochemical oxidation of carbon monoxide to carbon dioxide and is separated from a cathodic electrode in the cell by an ionically conductive electrolyte which is stable at the cell operating temperature,
   b. at the same time supplying an oxygen-containing gas at a constant flow rate and temperature to the cathodic electrode which is a gas permeable, hydrophobic, electronically conductive electrode which is capable of effecting electrochemical reduction of oxygen to $O^-$,
   c. measuring the resultant current or voltage generated in the electrochemically stoichiometric anodic and cathodic reactions in an external circuit between the two electrodes,
   d. repeating under the same conditions, steps (a), (b) and (c) a sufficient number of times with simulated or actual internal combustion exhaust gases of differing known concentrations of carbon monoxide to establish a correlation between current or voltage generated and a range of carbon monoxide concentrations, and
   e. repeating, under the same conditions, steps (a), (b) and (c) with internal combustion engine exhaust gas of unknown carbon monoxide concentration and measuring the current or voltage generated, said current or voltage being equivalent to a known concentration of carbon monoxide in the current or voltage-carbon monoxide concentration correlation obtained in step (d).

2. The method of claim 1 wherein the exhaust gas is swept into the anodic electrode with an inert gas.

3. The method of claim 2 wherein a sample of the exhaust gas is isolated and then swept into the anodic electrode with air.

4. The method of claim 1 wherein the electrolyte is an aqueous acid electrolyte sorbed onto a gas impermeable film consisting of a fibrous inorganic core having interconnecting pores.

5. The method of claim 4 wherein the aqueous acid electrolyte is aqueous phosphoric acid.

6. The method of claim 1 wherein the electrolyte is contained in a matrix.

7. The method of claim 6 wherein the matrix is a film of zirconium pyrophosphate and a polytetrafluoroethylene binder.

8. The method of claim 1 wherein the cell is operated at a temperature within the range 160°–210°F.

9. The method of claim 1 wherein the oxygen-containing gas is air.

10. The method of claim 1 wherein the cathodic electrode contains 5–10 milligrams/cm.$^2$ of platinum black.

11. The method of claim 1 wherein the external circuit between the two electrodes comprises in series a current measuring means and a variable resistor having a combined resistance which is less than that required to substantially impede the flow of the resultant current.

* * * * *